(12) United States Patent
Hilleary

(10) Patent No.: US 6,222,446 B1
(45) Date of Patent: Apr. 24, 2001

(54) METHOD AND APPARATUS FOR LIGHT OUTAGE DETECTION

(75) Inventor: Thomas N. Hilleary, Chesterfield, MO (US)

(73) Assignee: LaBarge, Inc., St. Louis, MO (US)

( * ) Notice: Subject to any disclaimer, the term of this patent is extended or adjusted under 35 U.S.C. 154(b) by 0 days.

(21) Appl. No.: 09/585,185

(22) Filed: Jun. 1, 2000

(51) Int. Cl.$^7$ .................................................. B60Q 11/00
(52) U.S. Cl. ..................... 340/458; 340/641; 315/132; 246/125; 246/473 R
(58) Field of Search ..................... 340/458, 931, 340/981, 641; 315/129, 133, 132; 246/125, 473 R

(56) References Cited

U.S. PATENT DOCUMENTS 4,518,963 * 5/1985 Rogers, Jr. ............................ 340/981
5,022,613 * 6/1991 Peel ...................................... 246/125

* cited by examiner

Primary Examiner—Edward Lefkowitz
(74) Attorney, Agent, or Firm—Armstrong Teasdale LLP

(57) ABSTRACT

To reduce or eliminate difficulties inherent in manual reporting of signal light failures, especially at remote railroad grade crossings, there is provided, in one embodiment of the present invention, a system for monitoring failure of a lighted signal that includes lighting configured to flash during a predetermined alarm condition. The system includes a power supply configured to power the lighting during the predetermined alarm condition and to provide a timing signal indicative of power being applied to the lighting; a detector/transmitter responsive to the timing signal to detect lighting parameters when the lighting is flashed on to generate a signal indicative of the lighting parameters and to generate a signal indicative of the lighting parameters; and a receiver/concentrator responsive to the signal indicative of the lighting parameters to generate a signal indicative of predetermined fault conditions of the lighting.

22 Claims, 3 Drawing Sheets

METHOD AND APPARATUS FOR LIGHT OUTAGE DETECTION

BACKGROUND OF THE INVENTION

This invention relates generally to methods and apparatus for detection of signal light parameters, and more particularly to methods and apparatus for detecting and reporting flashing signal light failures occurring at remote locations.

Railroads are now utilizing remote monitoring of signal locations as a tool for more rapid diagnosis of signaling problems. When such problems are promptly corrected, improved efficiency and safety of operations results.

Current methods of monitoring flashing warning lights in railroad applications are labor intensive to install and to calibrate, and do not provide a reliable, unambiguous, long-term indication of lamp performance.

One condition presently monitored at signal locations is the presence of AC power. Although backup battery systems are often employed, battery power is sometimes exhausted before AC power is restored and before maintenance personnel are alerted to the problem. To reduce the likelihood of this occurrence, backup battery systems having large reserve capacity are used. However, if an outage is persistent and goes undetected, as for example, when there is an open circuit breaker at the signal location, the first indication of trouble may occur only when the signal location is altogether nonfunctional. Timely reporting of AC power outages would help avoid such delays.

Techniques most often employed to report AC power outages measure bulk current through primary conductors supplying external lamps, and draw inferences to determine an exact number of bulbs that are operating correctly. These circuits are highly sensitive and the current detection components themselves (Hall effect devices) are prone to aging drift and nonlinearity.

Additional measures have been taken to alleviate problems associated with extended loss of AC power at highway crossings. For example, crossings are designed with separate operating battery and control battery systems. The battery systems have different capacities, so that, when AC power is lost, the operating battery is depleted first. The highway crossing is configured so that, upon depletion of the operating battery, the crossing is activated continuously. Ideally, the crossing will be reported as malfunctioning before the control battery is also depleted. Active crossings are also provided with indicator lights that are continuously lit when AC power is available. Employees are instructed to report an AC power off condition immediately to a dispatcher when they observe that the indicator lamps are off. Equipment houses at active crossing locations are also labeled with site-specific information and a toll-free telephone number that can be used by the public for reporting crossing problems.

Even with measures now in place, however, the reporting of crossing problems is still primarily a manual process, with inherent inaccuracies and delays. It would be desirable if these inaccuracies and delays could be reduced or eliminated. Moreover, many other crossing conditions, such as battery voltages and lamp currents, and for highway crossings, gate operation and activation status, are of interest and should be monitored. It has been difficult, however, to obtain timely reports of these conditions from remote locations.

BRIEF SUMMARY OF THE INVENTION

To reduce or eliminate difficulties inherent in manual reporting of crossing problems, in one embodiment of the present invention, there is provided a system for monitoring failure of a lighted signal having lighting configured to flash during a predetermined alarm condition. The system includes a power supply configured to power the lighting during the predetermined alarm condition and to provide a timing signal indicative of power being applied to the lighting; a detector/transmitter responsive to the timing signal to detect lighting parameters when the lighting is flashed on to generate a signal indicative of the lighting parameters and to generate a signal indicative of the lighting parameters; and a receiver/concentrator responsive to the signal indicative of the lighting parameters to generate a signal indicative of predetermined fault conditions of the lighting.

DETAILED DESCRIPTION OF THE INVENTION

Figure 1:
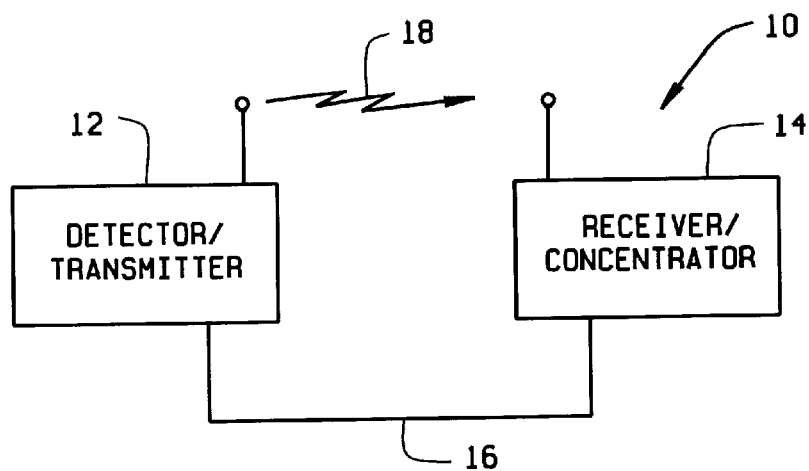
FIG. 1 is a simplified block diagram of one embodiment of a light outage detection system of the present invention.

In one embodiment, and referring to FIG. 1, a light outage detection system 10 has two main component systems. The first is a detector/transmitter 12 that detects one or more lighting parameters such as brightness or intensity, lamp head voltage, and flash rates of lamps in a lamp head. The second is a central receiver/concentrator 14 to which information relating to the lighting parameters is sent for analysis of possible alarm conditions. In one embodiment, a receiver/concentrator 14 receives lighting parameter information from up to six detector/transmitters 12 and each detector/transmitter 12 monitors up to four separate lights. The number of detector/transmitters 12 monitored by a receiver/concentrator 14 and the number of lights monitored by each detector/transmitter 12 differ in other embodiments. Most typically, the lights being analyzed are flashing lights, so that lighting parameter information relating to performance data is sent following each flash cycle. In one embodiment, this information is sent via spread spectrum communication, and is transmitted, for example, on power lines 16 for the flashing lights themselves, or as a field radiated signal 18 (i.e., a radio frequency [RF] signal).

Figure 2:
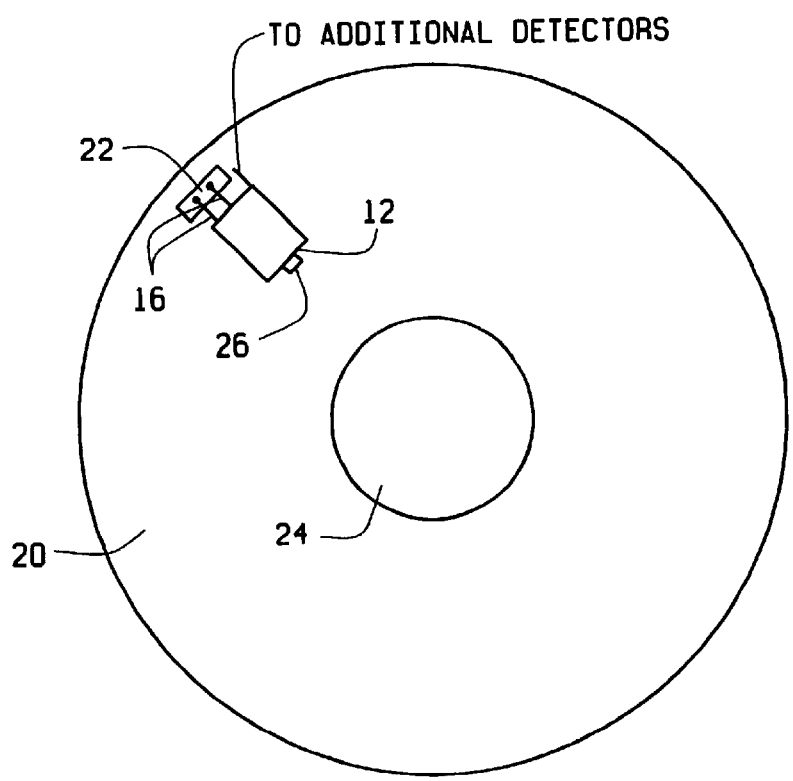
FIG. 2 is a drawing of a flasher lamp showing mounting of one embodiment of a detector/transmitter thereon.

A typical installation of one embodiment of the present invention is as a light outage detector on a railroad grade crossing signal. In one embodiment and referring to FIG. 2, a detector/transmitter assembly 12 is a small, credit-card sized device 13 mounted in a lamp head reflector 20, on a two-screw terminal block 22 that interfaces field wiring 16 between a signal bungalow and one or more incandescent or LED lamps 24 located in lamp head 20. A photodiode or other optical detector 26 of detector/transmitter 12 is configured to receive and detect light directly from lamp 24. In this embodiment, the lighting includes a plurality of lamps 24 configured to flash during a signaling event, and detector/transmitter 12 is configured to be responsive to lighting parameters of at least some of the plurality of lamps 24. For example, three additional flashing lamps (not shown) on the same structure are sensed as well. For example, optical light guide (not shown) interface detector/transmitter 12 to adjacent bulbs (also not shown), or additional, multiplexed photodiodes 28 (shown in FIG. 3) are interfaced to adjacent bulbs. In one embodiment, multiple lamps 24 are located in lamp heads 20, and separate optical detectors 26 are provided for each lamp 24 in a lamp head 20. In this manner, one detector/transmitter monitors light output at a total of four lamp heads 20 on a single pole.

Calibration is accomplished by activating the lamps 24, which causes all detector/transmitters to receive power in parallel with lamps 24 that are being powered. During each flash cycle, every detector/transmitter 12 measures and transmits status, intensity, and voltage level of a lamp 24 or lamps that it is monitoring to receiver/concentrator 14.

Figure 3:
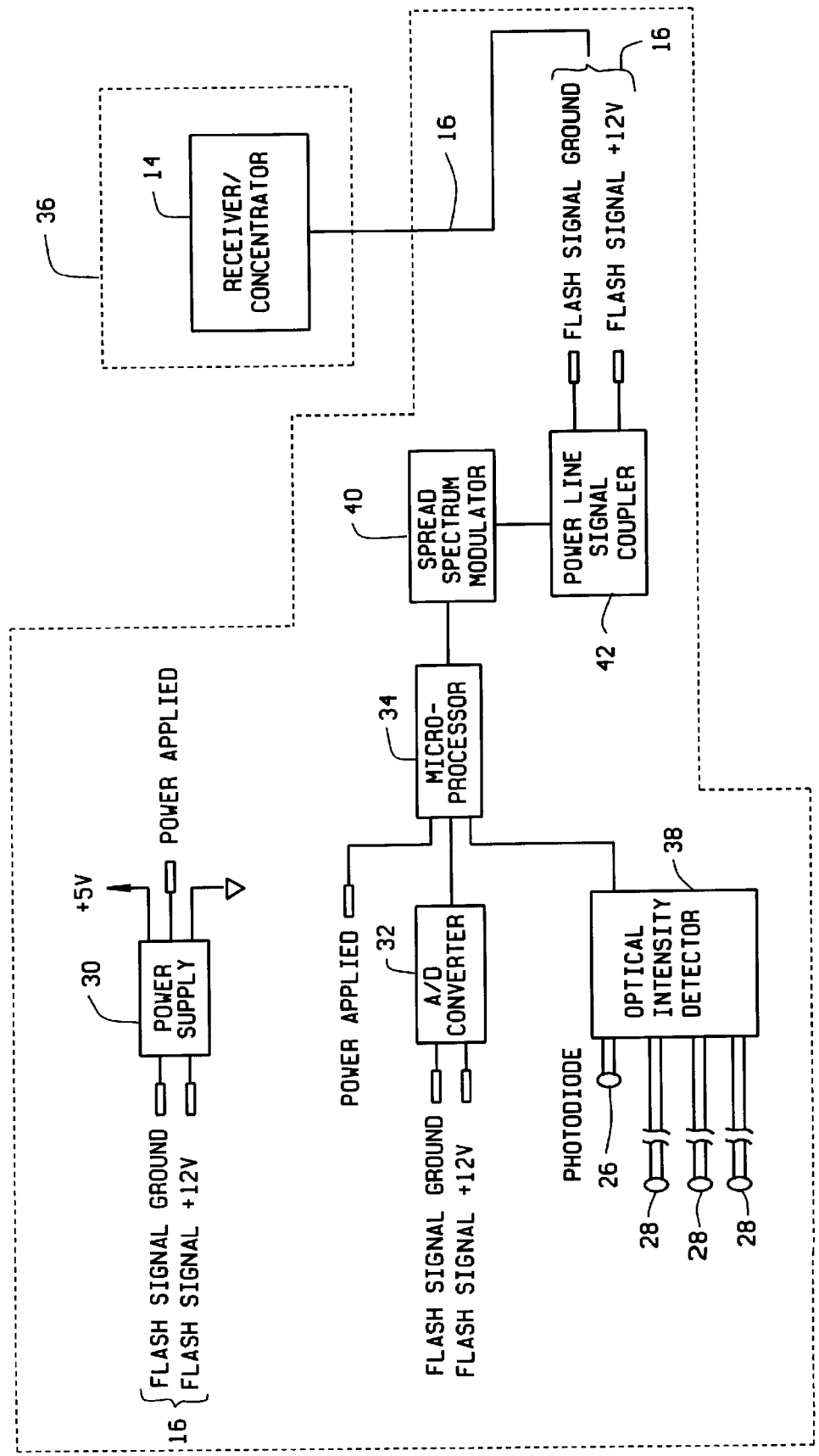
FIG. 3 is a block diagram of one embodiment of a light outage detection system, showing additional details of the detector/transmitter.

Referring to FIG. 3, during a predetermined alarm condition, such as an approach of a train (resulting in activation of the railroad grade crossing signal), a power supply block 30 converts the flashing 12 volt supply that is delivered to individual lamps 24 when the crossing is activated to a constant 5 volt signal that is used to power detector/transmitter 12. Thus, no additional power source other than the flashing 12 volt supply that is normally present is required to power detector/transmitter 12. In addition, for synchronization purposes, power supply block 30 provides a timing signal ("power applied") that indicates when power is or is not being applied to lamps 24. This timing signal is used to synchronize times during which the detector function within detector/transmitter 12 is used to verify that lamps 24 are on, and to synchronize times to sense the lamp head voltage.

When power supply block 30 indicates that voltage is present, an analog to digital converter (ADC) block 32 digitizes a measurement of the voltage and communicates this measurement to a microprocessor block 34. Microprocessor block 34 formats and delivers the measurement information to a receiver/concentrator 14 located at signal bungalow 36 controlling the crossing facility. In one exemplary embodiment, ADC 32 voltage measurement has a resolution of 8 bits.

Microprocessor block 34 receives lamp intensity information from an optical intensity detector 38 monitoring up to four lamps 24, along with voltage at a physical/electrical terminal strip interface point from ADC 32. This information is converted into a suitable form for delivery to receiver/concentrator 14. For example, the information is converted into a serial bit stream and transmitted via field signal wiring 16 or radiated via an RF signal 18. In one embodiment, a spread-spectrum modulator/demodulator 40 (for example, an INTELLON® SSC P200 available from Intellon, Inc., Ocala, Fla.) is used to transmit the information via the field signal wiring 16 to receiver/concentrator 14. In another embodiment, a spread spectrum modulator/demodulator 40 is used in conjunction with a low power RF generator (not shown) for wireless transmission. Flash rate is also determined and included in the message along with a unique detector/transmitter 12 identification number. In embodiments in which more than one lamp 24 is being monitored, a lamp position number (LPN) is also included in the message. Thus, sufficient information is provided for receiver/concentrator 14 is able to determine how many and which, if any, lamps 24 are malfunctioning.

In an embodiment in which information is transmitted via field signal wiring 16 to receiver/concentrator 36, the "power applied" signal from power supply block 30 is used by microprocessor block 34 to time delivery of information to coincide with the voltage present state, to ensure that a metallic path exists back to receiver/concentrator 14. Signal coupler block 42 comprises circuitry to couple transmissions from spread spectrum modulator 40 onto field signal wiring 16 for delivery to receiver/concentrator 14.

Figure 4:
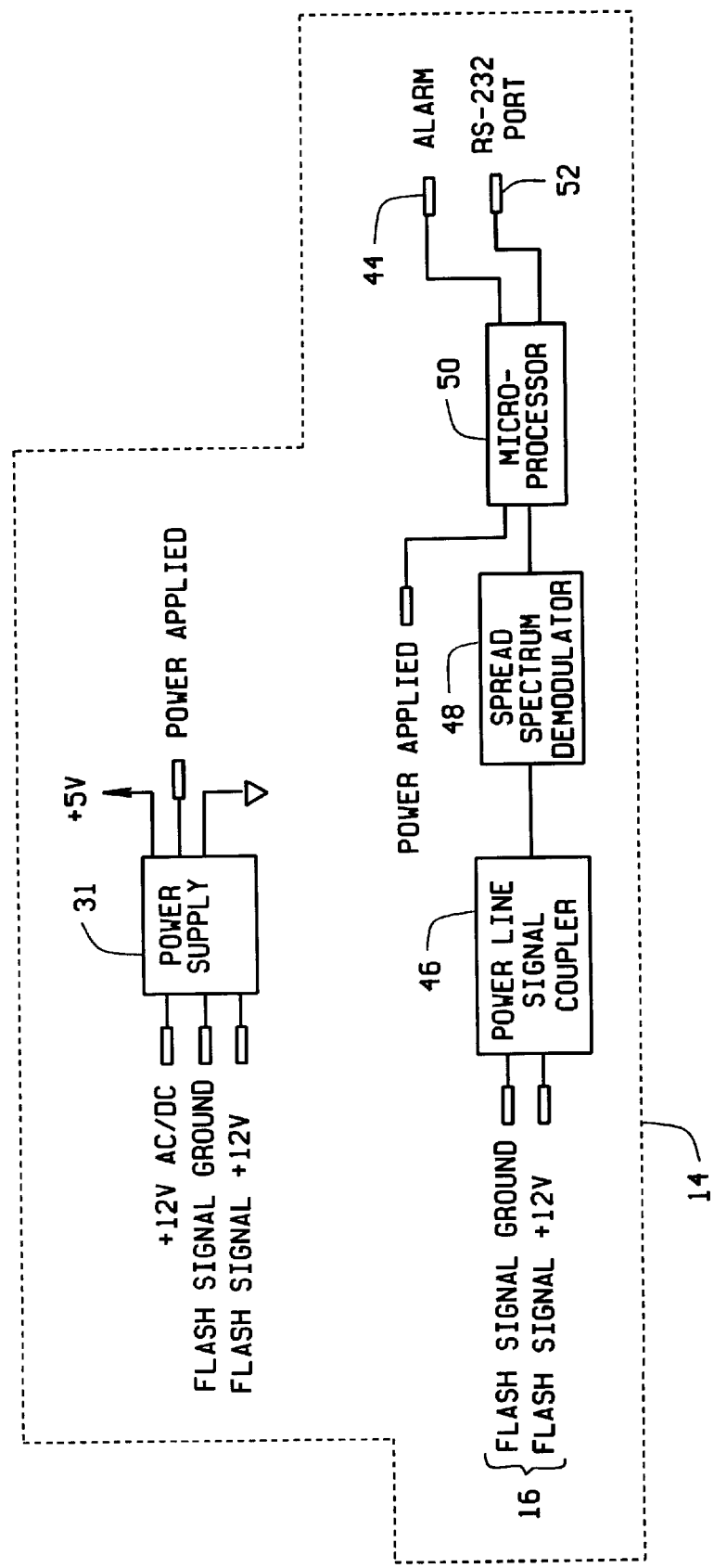
FIG. 4 is a more detailed block diagram of one embodiment of the receiver/concentrator shown in FIG. 3.

Referring to FIG. 4, receiver/concentrator 14 receives an asynchronous message burst each flash cycle from all monitored active detector/transmitters 12. If receiver/concentrator 14 expects but does not receive lighting parameter information affirming that illumination, flash rate, and lamp head voltage are within preselected limits, it delivers an alarm signal 44 to an external alarm communication device (not shown). If a power applied signal is present but receiver/concentrator 14 receives no incoming information affirming the illumination and flash rate status of connected lamps 24, then receiver/concentrator 14 delivers an alarm signal 44 to the external alarm communication device. Alarm signal 44 is thus indicative of predetermined fault conditions of the lighting.

A power supply block 31 provides a constant 5 volt DC voltage to power receiver/concentrator 14. In addition, an input from a flashing relay (not shown) provides power supply block 30 with timing information to produce a "power supplied" signal that is used to synchronize microprocessor block 48 of receiver/concentrator 14, and to synchronize transmissions from a number of detector/transmitters 12.

In one embodiment, a power line signal coupler 46 of receiver/concentrator 14 contains circuitry configured to couple a lighting parameter information signal on field signal wiring 16 to a demodulator 48. (In embodiments in which an RF signal 18 is transmitted, couplers 42 and 46 are replaced by an RF transmitter and receiver [not shown], respectively.)

In one embodiment, an INTELLON® SSC P200 spread spectrum modulator/demodulator 48 is used to demodulate a spread spectrum signal delivered via field signal wiring 16 to receiver/concentrator 14. Using a "power applied" signal from power supply block 31, a microprocessor block 50 is synchronized with incoming serial data. The use of a spread spectrum signal and multiple repetitions of serial information in one embodiment ensures that microprocessor block 50 experiences a high success rate in sorting and correctly receiving asynchronous data from a number of different detector/transmitters 12.

Microprocessor block 50 receives and interprets incoming serial asynchronous data from a number of detector/transmitters 12. In one embodiment, upon initialization, receiver/concentrator 14 dynamically takes inventory of lamps 24 that are activated, based upon signals received from detector/transmitters 12. In this manner, receiver/concentrator 14 is able to "remember" what lamps 24 should be active when the crossing is active. When at least one lighting parameter such as flash rate or lamp head voltage is outside predetermined values, or when an insufficient number or an unacceptable combination of lamps 24 are operating, microprocessor block 50 delivers an alarm signal to an external alarm communication device. Microprocessor block 50 also includes a communication port 52 (for example, a serial port) configured for communication with an external device, such as a laptop computer (not shown). Microprocessor block 50 is configured to provide the current status of all lamps, flash rates, and voltages to the external device through communication port 52 so that this information can be displayed, such as on a graphic user interface application running on the laptop computer. Because of the multiplicity of lamps 24 in a crossing warning device, and/or a multiplicity of lamps 24 in a single lamp head 20, a successful warning event may be considered to have occurred despite one or more lamp 24 failures. Therefore, in one embodiment, microprocessor block 50 is configured to receive information relating to the numbers or combinations of operating lamps required to comprise a successful crossing warning event via communication port 52, thereby providing adjustment of thresholds for triggering warnings or failure indications as desired.

Memory (not separately shown in FIG. 4) associated with microprocessor block 50 is provided to archive crossing activation performance data, including, but not necessarily limited to, triggering warnings and failure indications. (For example, failures of individual lamps 24 even during warning indications meeting the threshold for a successful event are recorded in one embodiment.) This archived data is accessible via communication port 52, so that a user is able to diagnose past crossing activation performance.

From the preceding description of various embodiments of the present invention, it is evident that problems inherent in manual reporting of railroad grade crossing problems are reduced and eliminated.

Although the invention has been described and illustrated in detail, it is to be clearly understood that the same is intended by way of illustration and example only and is not to be taken by way of limitation. For example, in other embodiments, modifications are made to more suitably accommodate other types of signaling devices. Accordingly the spirit and scope of the invention are to be limited only by the terms of the appended claims and their equivalents.

What is claimed is:

1. A system for monitoring failure of a signal having lighting configured to flash during a predetermined alarm condition, said system comprising:
   a power supply configured to power the lighting during the predetermined alarm condition and to provide a timing signal indicative of power being applied to the lighting;
   a detector/transmitter responsive to the timing signal to detect lighting parameters when the lighting is flashed on to generate a signal indicative of the lighting parameters and to generate a signal indicative of the lighting parameters; and
   a receiver/concentrator responsive to said signal indicative of the lighting parameters to generate a signal indicative of predetermined fault conditions of the lighting.

2. A system in accordance with claim 1 wherein said detector/transmitter is mounted in a lamp head of the lighting.

3. A system in accordance with claim 1 further comprising couplers configured to communicate said signal indicative of the lighting parameters from said detector/transmitter to said receiver concentrator.

4. A system in accordance with claim 3 wherein the lighting parameters comprise power supply voltage and brightness.

5. A system in accordance with claim 4 wherein the lighting comprises a plurality of lamps configured to flash during the predetermined alarm condition, and wherein said detector/transmitter is configured to be responsive to lighting parameters of at least some of the lamps.

6. A system in accordance with claim 5 wherein said detector/transmitter comprises an optical intensity detector configured to sense light emitted from a plurality of lamps.

7. A system in accordance with claim 6 wherein said system comprises a plurality of said detector/transmitters each having a coupler, said coupler is configured to transmit asynchronous message bursts during each flash cycle of the lamps, said message bursts including an indication of the lighting parameters, and said receiver/concentrator is configured to be responsive to said timing signal to control reception of said asynchronous message bursts from each of said plurality of detectors.

8. A system in accordance with claim 7 wherein said lighting parameters include flash rate, said detector/transmitters are configured to determine a flash rate, and said signal indicative of the lighting parameters includes said signal being indicative of the determined flash rate.

9. A system in accordance with claim 7 wherein each said detector/transmitter is configured to provide a unique detector identification number to the coupler and an identification of a position of each lamp monitored by said detector/transmitter.

10. A system in accordance with claim 7 wherein said detector/transmitter comprises a spread spectrum modulator configured to modulate said signal indicative of lighting parameters for transmission to said receiver/concentrator, and said receiver/concentrator comprises a spread spectrum demodulator configured to demodulate said modulated transmissions.

11. A system in accordance with claim 10 wherein said system is installed on a railroad grade crossing signal, the predetermined alarm condition is the approach of a train, and said receiver/concentrator is located in a signal bungalow.

12. A system in accordance with claim 11 wherein said couplers are configured to transmit said signal indicative of the lighting parameters from said detector/transmitter to said receiver/concentrator via a radio frequency link.

13. A system in accordance with claim 11 wherein said couplers are configured to transmit said signal indicative of the lighting parameters from said detector/transmitter to said receiver/concentrator via field signal wiring.

14. A system in accordance with claim 13 wherein said detector/transmitter is configured to transmit said signal indicative of the lighting parameters during application of power to the lighting.

15. A system in accordance with claim 11 wherein the lighting parameters comprise lamp head voltages, lamp brightnesses, and flash rates, and said receiver/concentrator is configured to generate an alarm signal when any of detected flash rates, lamp head voltages, and numbers and combinations of lamps operating are outside of predetermined limits.

16. A system in accordance with claim 7 wherein said receiver/concentrator comprises a processor having a memory, and said processor is configured to archive information concerning the lighting parameters.

17. A system in accordance with claim 7 wherein said receiver/concentrator is configured to deliver an alarm signal to said external alarm communication device in the event said timing signal is present but said receiver/concentrator receives no transmitted signal affirming flashing of the lamps.

18. A method for confirming proper operation of a lighted signaling device flashing a plurality of lamps in response to a predefined alarm condition, said method comprising the steps of:
   gating a plurality of detector/transmitters in accordance with the flashing of the lamps so parameters of each lamp are detected at times when a flash is to occur;
   transmitting signals indicative of the lighting parameters from the detector/transmitters to a receiver/concentrator; and analyzing the lighting parameters at the receiver/ concentrator to determine performance of the lighted signaling device.

19. A method in accordance with claim 18 wherein transmitting signals indicative of lighting parameters comprises the step of transmitting signals indicative of at least one parameter selected from the group consisting of applied voltage, brightness, and flash rate.

20. A method in accordance with claim 19 wherein the receiver/concentrator is in a signaling bungalow, and transmitting signals indicative of lighting parameters comprises the step of transmitting spread spectrum signals indicative of lighting parameters.

21. A method in accordance with claim 20 wherein transmitting spread spectrum signals indicative of lighting parameters comprises the step of transmitting the spread spectrum signals via field signal wiring.

22. A method in accordance with claim 21 and further comprising the step of coordinating said transmission of spread spectrum signals indicative of lighting parameters with a gating signal.

* * * * *